June 14, 1960    J. E. GUTRIDGE ET AL    2,940,403
TRAILER POSITIONING MECHANISM
Filed Aug. 13, 1954    4 Sheets-Sheet 1
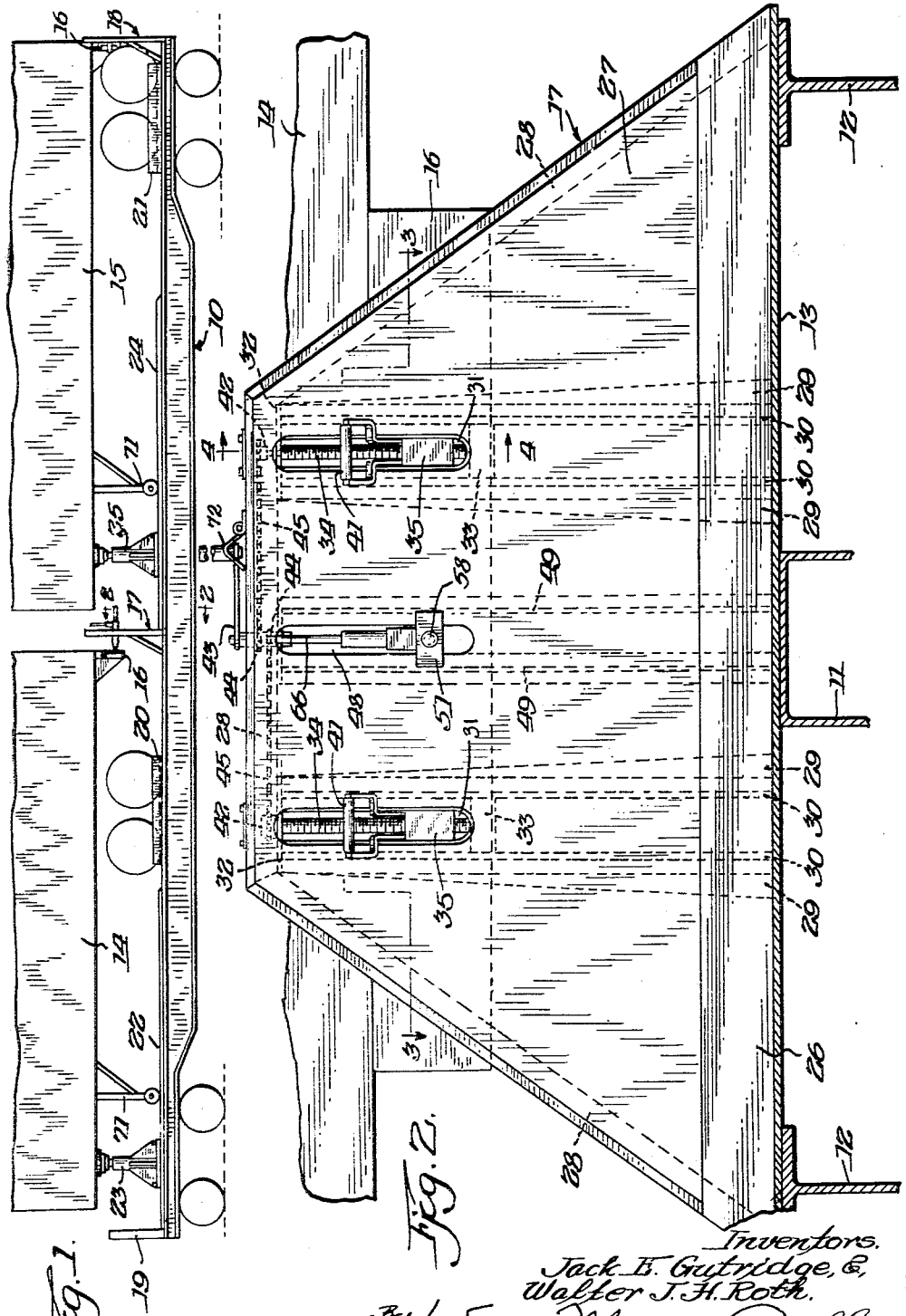

June 14, 1960
J. E. GUTRIDGE ET AL
2,940,403
TRAILER POSITIONING MECHANISM
Filed Aug. 13, 1954
4 Sheets-Sheet 2
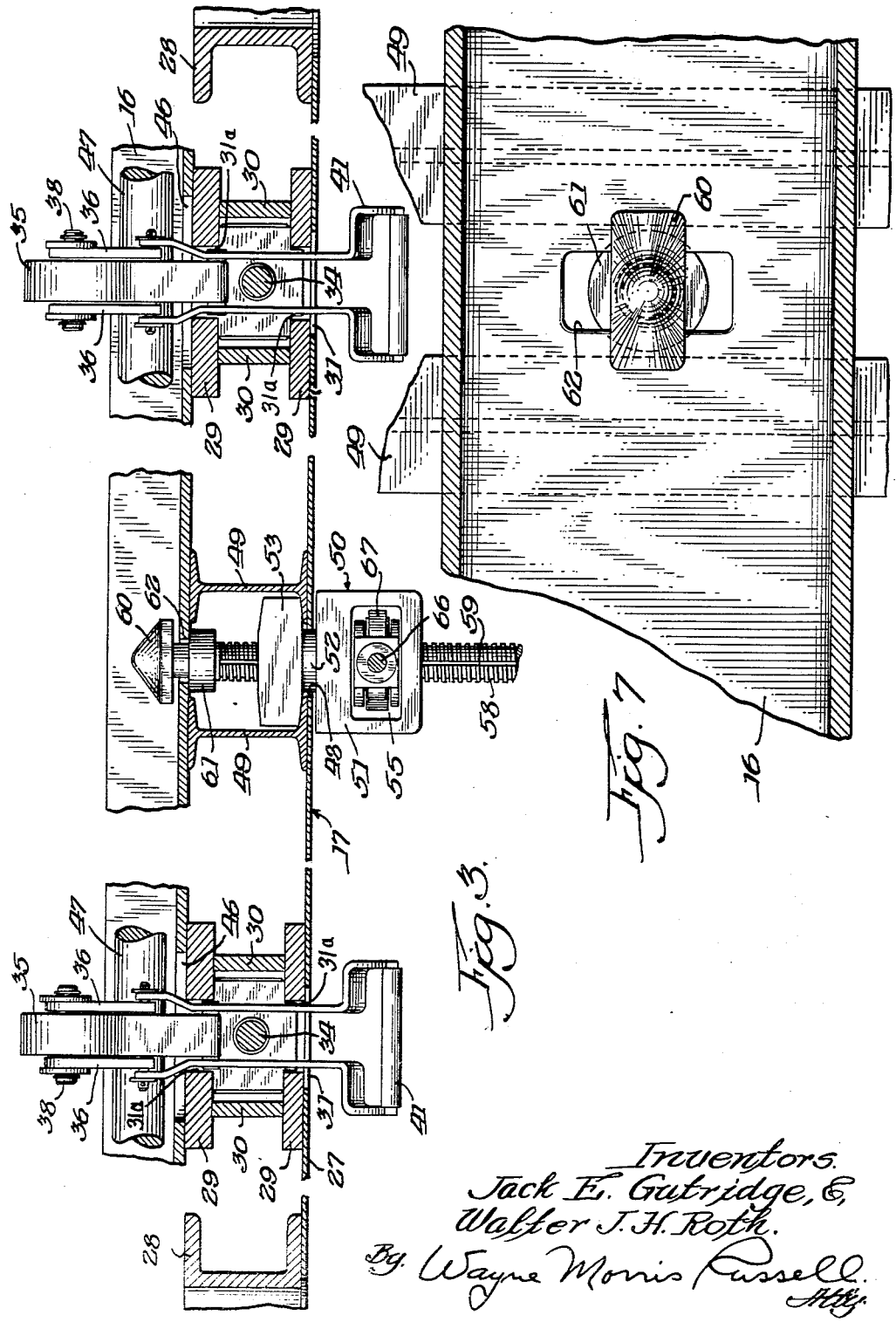
Inventors.
Jack E. Gutridge, &
Walter J. H. Roth.
By Wayne Morris Russell
Atty.

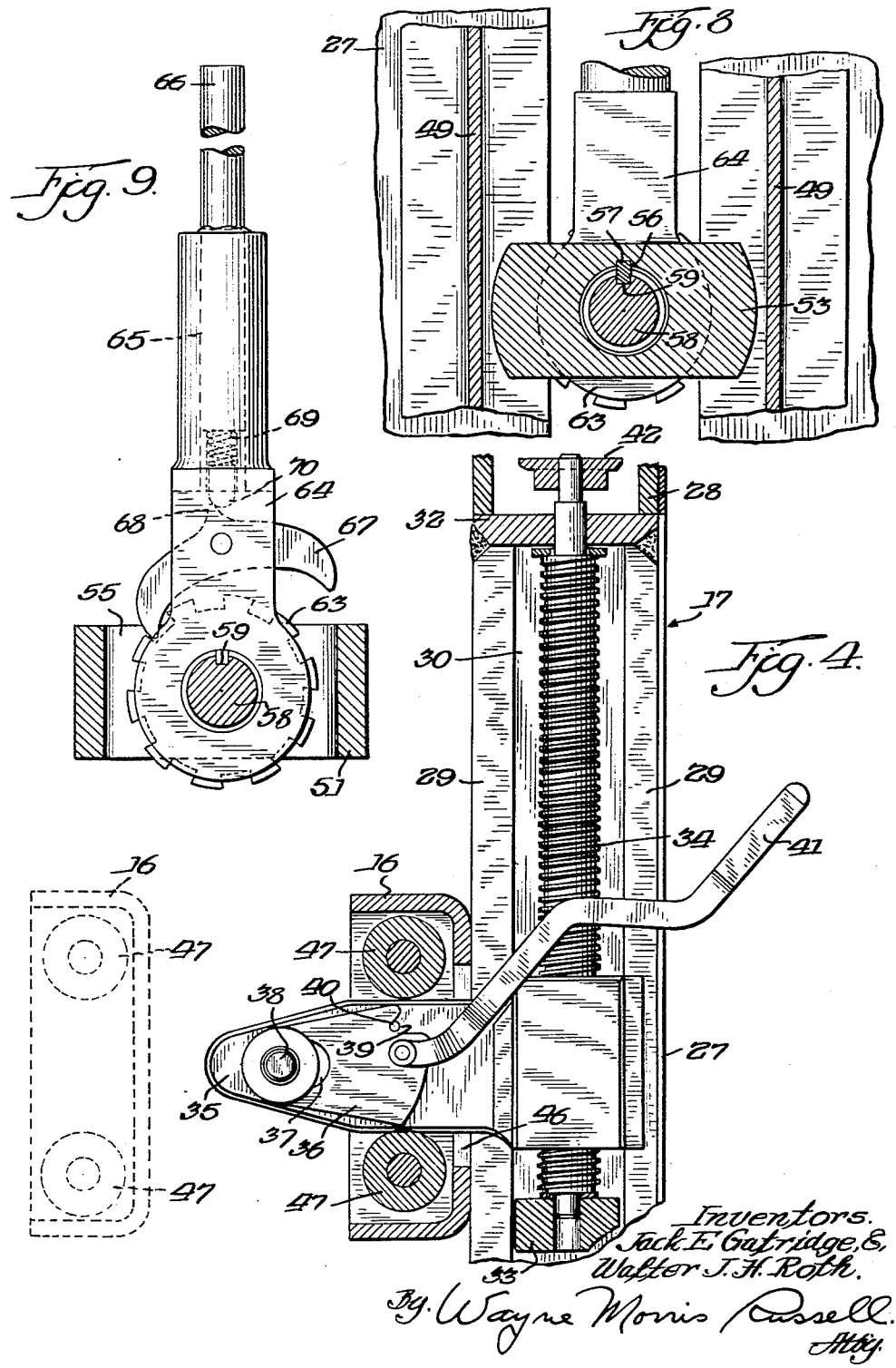

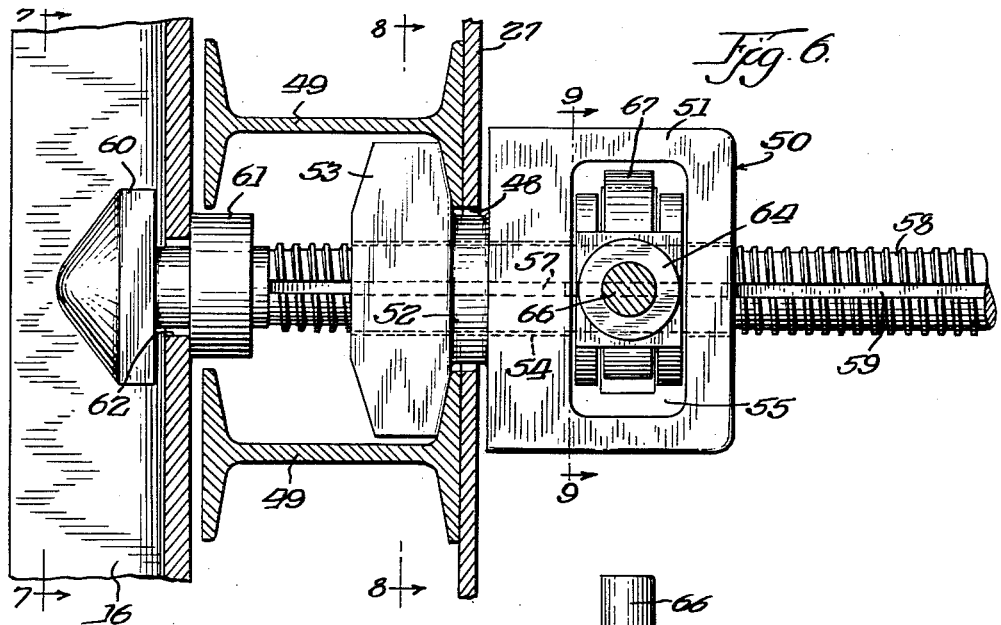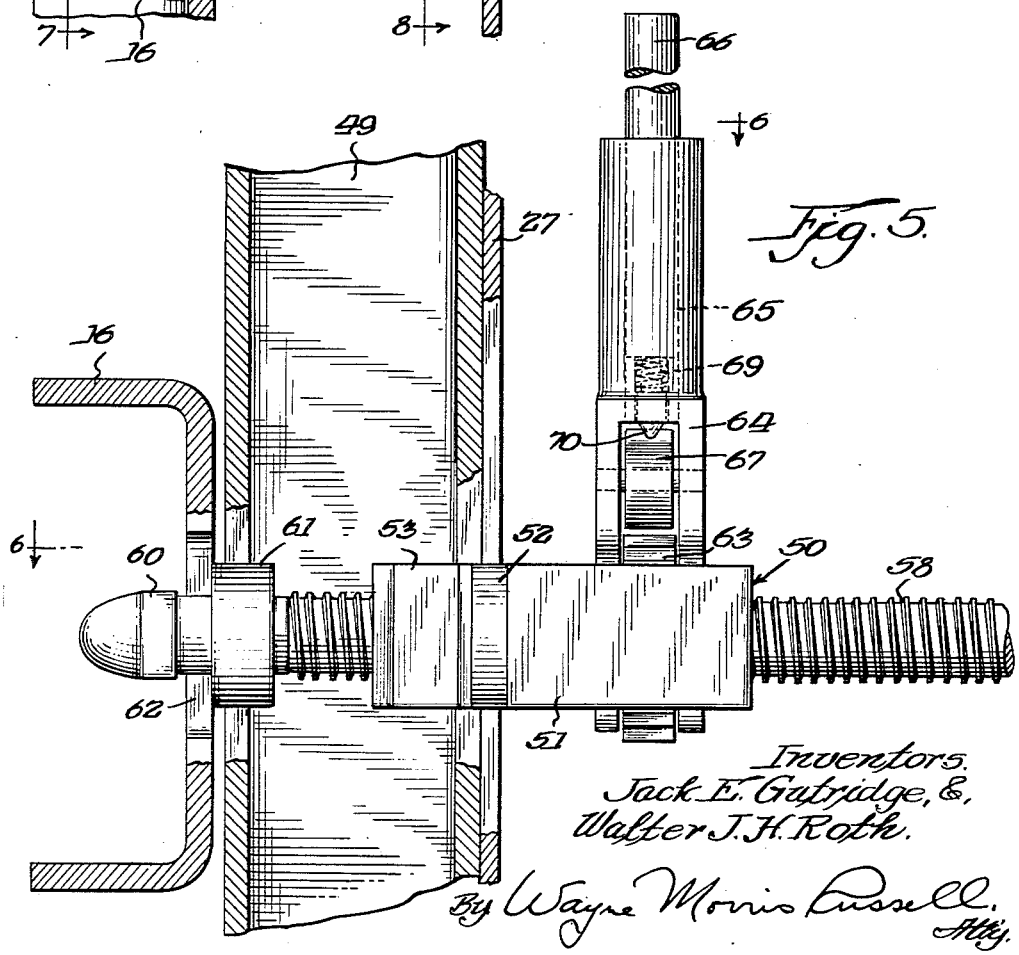

United States Patent Office 2,940,403
Patented June 14, 1960

2,940,403

TRAILER POSITIONING MECHANISM

Jack E. Gutridge, Munster, and Walter J. H. Roth, Cedar Lake, Ind., assignors to Pullman Incorporated, a corporation of Delaware Filed Aug. 13, 1954, Ser. No. 449,723

10 Claims. (Cl. 105—368)

This invention relates to a hold-down device adapted to hold a truck trailer on a freight vehicle, and is primarily concerned with a pushing and pulling mechanism mounted on the hold-down device adapted to aid in the loading and unloading of a trailer on the vehicle.

The principal object of the invention is to provide means on a hold-down device to aid in the loading and unloading of a trailer on a freight vehicle at locations where a lift truck is not available.

A more specific object of the invention is to provide a mechanism on a hold-down device for moving a trailer on or off projections on the hold-down device in loading or unloading the trailer at a small railroad station where a lift truck is not available.

Another object of the invention is to provide means for completely removing the pushing and pulling mechanism from the hold-down device when the mechanism is not in use.

A further object of the invention is to provide a novel pawl and ratchet arrangement on the pushing and pulling mechanism.

The foregoing and other objects of the invention are attained by the construction and arrangement illustrated in the accompanying drawings wherein:

Fig. 1 is a side elevational view of a railway flat car showing two truck trailers to be transported loaded thereon and one of the trailers being spaced from its hold-down device and the other of the trailers being engaged with its hold-down device;

Fig. 2 is an enlarged partial vertical sectional and a partial elevational view taken on the line 2—2 of Fig. 1, but showing the trailer in engagement with the hold-down device;

Fig. 3 is an enlarged broken horizontal sectional view taken on the line 3—3 of Fig. 2;

Fig. 4 is an enlarged vertical sectional view taken on the line 4—4 of Fig. 2 and showing the bumper on one of the trailers before it is engaged with the hold-down device in dotted lines;

Fig. 5 is a fragmentary vertical sectional view through the hold-down device near its center showing the mechanism for moving a bumper of a trailer on or off the projections on the device;

Fig. 6 is a horizontal sectional view taken on the line 6—6 of Fig. 5;

Fig. 7 is a vertical sectional view taken on the line 7—7 of Fig. 6, showing parts in elevation;

Fig. 8 is a vertical sectional view taken on the line 8—8 of Fig. 6; and

Fig. 9 is a vertical sectional view taken on the line 9—9 of Fig. 6.

The invention proposes a pushing and pulling mechanism for moving the bumper of a trailer on or off the projections on a hold-down device in loading and unloading trailers on freight cars at locations where a lift truck is not available to perform this operation. A thrust element is carried by the hold-down device and a horizontally disposed jackscrew is slidably and nonrotatably mounted in the element. A head is secured on one end of the jackscrew and a stop is spaced from the head and is secured on the jackscrew and the head and stop are adapted to engage the bumper of the trailer. A ratchet wheel is positioned in a hole in the thrust element and is in threaded engagement with the jackscrew and a handle has one end disposed in the hole in the element and is swingably mounted on the jackscrew. Means are carried by the handle and are adapted to engage the ratchet wheel to rotate the ratchet wheel in either direction. Turning of the ratchet wheel in one direction causes the head on the jackscrew to engage the bumper and move the bumper on the projections and turning of the ratchet wheel in the opposite direction causes the stop on the jackscrew to engage the bumper and move the bumper off the projections.

In the drawings, 10 generally designates a freight vehicle in the form of a railway flat car having a center sill structure 11 and side sills 12 and a floor 13 on the center sill structure and the side sills. A pair of truck trailers 14 and 15 are adapted to be transported on the car and each trailer is provided with a substantially horizontally disposed channel-shaped bumper 16 fixedly secured to and depending from the rear end of the respective trailer. At the center of the car a vertically disposed back support 17 is fixedly secured to the floor 13 and is adapted to be engaged with the bumper 16 on the trailer 14. At one end of the car another vertically disposed back support 18 is fixedly secured to the floor 13 and is adapted to be engaged with the bumper 16 on the trailer 15. At the other end of the car a wall 19 is fixedly secured to the floor 13. A turntable 20 is pivotally mounted at its center in a slot in the floor 13 extending longitudinally of the car and is used in loading the trailer 14 on the car, and another turntable 21 similarly mounted on the floor of the car is used in loading the trailer 15 on the car. A raised structure 22 is secured to the floor 13 of the car adjacent the wall 19 and this structure has guideways therein extending longitudinally of the car. A fifth wheel stand 23 is adapted to receive the fifth wheel pin of the trailer 14 and to support the front end of the trailer and the stand is slidable longitudinally of the car in the guideways of the raised structure 22. Another raised structure 24 extends from the center of the car toward one end thereof and is similar to the raised structure 22 and a fifth wheel stand 25 is adapted to support the front end of the trailer 15 and is mounted in the raised structure 24 in a manner similar to the mounting of the stand 23 in the raised structure 22.

Since the back supports 17 and 18 are identical, only the back support 17 will be described. The back support 17 (Fig. 2) has a horizontally disposed angle 26 secured to the floor 13 of the car and a vertically disposed trapezoidal metal sheet 27 is secured by its longest edge to the angle and channel framing members 28 are secured to the other three edges of the metal sheet. There are a total of four plates 29 and a total of four plates 30 on the back support 17. One pair of plates 29 are located adjacent to one of the sloping framing members 28 and one of these plates is secured to the metal sheet 27 and one pair of the plates 30 are spaced apart and extend between and are secured to the plates 29. The metal sheet 27 has two spaced vertically extending slots 31 therein and said one pair of plates 29 have vertically extending slots 31a therein arranged in registering relation with one of the slots 31. A cap 32 is positioned on top of said one pair of plates 29 and said one pair of plates 30 and is secured to these plates and a block 33 is supported by lugs between the plates. The other pair of plates 29 are located adjacent to the other of the sloping framing members 28 and one of these plates is secured to the metal sheet 27 and the other pair of plates 30 extend between and are secured to the plates 29 and the pair of plates 29 have vertically extending slots 31a therein arranged in registering relation with the other slot 31 in sheet 27. A cap 32 is positioned on top of the last-named plates 29 and 30 and is secured to these plates and a block 33 is supported by lugs between the plates. A vertical adjusting mechanism is mounted in each pair of plates 29 and 30, as best shown in Figs. 3 and 4, and since these mechanisms are identical only one will be described. A vertically disposed jackscrew 34 is rotatably mounted in the cap 32 and block 33 and a horizontally disposed projection 35 extends through the slots 31a in the plates 29 and has a threaded opening in threaded engagement with the jackscrew. A pair of cams 36 having closed slots 37 are positioned on opposite sides of the projection 35 and a pin 38 extends through the slots in the cams and through the projection, and washers and snap rings are placed on the ends of the pin. Each cam 36 has a notch 39 therein and pins 40 are pressed in holes in opposite sides of the projection 35 and extend therefrom and the notches are adapted to receive the pins. A handle 41 projects through the slot 31 in the sheet 27 and the slots 31a in plates 29 and the handle consists of a pair of spaced legs on opposite sides of the projection 35 and a hand grip secured to the outer ends of the legs. The inner end of each leg of the handle 41 is pivotally connected to the adjacent cam 36. A sprocket wheel 42 is secured to the upper end of each jackscrew 34 and a crank 43 is rotatably mounted in the top of the back support 17 in the adjacent framing member 28 to turn about a vertical axis and a pair of vertically spaced sprocket wheels 44 are fixedly secured on the crank. A sprocket chain 45 is mounted on the sprocket wheel 42 on one jackscrew 34 and on one of the sprocket wheels 44 on the crank 43 and another chain 45 is mounted on the wheel 42 on the other jackscrew 34 and on the other of the wheels 44 on the crank 43. The bumper 16 has a pair of spaced openings 46 in its web and a pair of horizontally disposed rollers 47 are rotatably mounted on the bumper at the upper edge and the lower edge of each opening. Turning of the crank 43 will cause the projections 35 to move upwardly or downwardly on the jackscrews 34 according to the direction in which the crank is turned. A bifurcated latch 72 is pivotally mounted on the horizontal framing member 28 and is adapted to engage the crank 43 to keep the crank from turning and prevent movement of the projections 35 on the jackscrews 34. The projections 35 need to be vertically adjustable so that they can be placed directly opposite the openings 46 in the bumper 16 of the trailer 14.

The sheet 27 is provided with a vertically extending slot 48 midway between the slots 31 in the sheet to accommodate a pulling and pushing mechanism, and a pair of vertically disposed I-beams 49 are disposed on opposite sides of the slot 48 and these beams extend substantially full height of the back support 17 and are secured to the angle 26 and the sheet 27, and a cap is positioned on top of and is secured to the beams and the adjacent framing member 28. A thrust element 50 has a substantially rectangular-shaped body 51 and a cylindrical neck 52 and a substantially rectangular-shaped head 53. The neck 52 of the element 50 is positioned in the slot 48 of the back support 17 and the head 53 is arranged transversely of the slot and the body 51 is arranged transversely of the slot. The head 53 of element 50 has one transverse dimension, which is its length, greater than the width of the slot 48 and has another transverse dimension, which is its width, less than the width of the slot. The body 51 of element 50 has one transverse dimension, which is its length, greater than the width of the slot 48 in the back support 17. The element 50 has an opening 54 therein which extends through the head 53 and neck 52 and body 51 of the element. The body 51 of element 50 is provided with a hole or slot 55 which extends transversely therethrough and is in communication with and intersects the opening 54. The wall of the opening 54 of the element 50 has a longitudinally extending groove 56 therein which begins at the outer surface of the head 53 and extends through the head and neck 52 and into the body 51 and terminates at the hole 55 in the body. A key 57 having the same extent as the groove 56 is secured in the groove in the opening 54 in thrust element 50. A horizontally disposed jackscrew 58 having an unthreaded portion at one end is positioned in the opening 54 in the element 50. The jackscrew 58 is provided with a longitudinally extending groove 59 coextensive with the threaded portion of the screw and the key 57 is disposed in this groove to slidably and nonrotatably mount the screw in the element 50. The jackscrew 58 has a substantially rectangular-shaped head 60 integral with its nonthreaded end and a collar 61 is spaced from the head and is integral with the screw. A vertically extending slot 62 is provided in the bumper 16 between the openings 46, and the head 60 on the jackscrew 58 is adapted to be inserted in the slot. The head 60 on the jackscrew 58 has one transverse dimension or length greater than the width of the slot 62 in the bumper 16 and less than the slot length, and the other transverse dimension or width less than the width of the slot in the bumper and less than the width of the slot 48 in the back support 17. The outside diameter of the collar 61 on the jackscrew 58 is greater than the width of the slot 62 in the bumper 16 and is less than the width of the slot 48 in the back support 17. A ratchet wheel 63 is positioned in the hole 55 in the body 51 of element 50 and has a threaded opening which is in threaded engagement with the jackscrew 58. A yoke 64 is positioned in the hole 55 in the body 51 of element 50 and the two parallel arms of the yoke have aligned openings through which the jackscrew 58 loosely extends, thus swingably mounting the yoke on the screw. The other arm of the yoke 64 has an aperture 65 extending longitudinally therethrough and a handle 66 extends part of the way into the aperture and is secured to the arm. A double-acting pawl 67 is pivoted between the two parallel arms of the yoke 64. A lug 68 is formed integral with the pawl 67 at the center of the pawl. A coil spring 69 is disposed in the aperture 65 in the yoke 64 and bears against the adjacent end of the handle 66, and a plunger 70 is disposed in the aperture against the spring and the spring urges the plunger into engagement with the pawl 67. More specifically, the center line through the plunger 70 passes through the center of the pin on which the pawl 67 is pivoted and the spring 69 urges the plunger into engagement with either side of the lug 68. When the plunger 70 engages one side of the lug 68, one end of the pawl 67 engages the ratchet wheel 63 and by oscillating the handle 66, the ratchet wheel is rotated in one direction. If it is desired to rotate the ratchet wheel 63 in the opposite direction, the operator grasps the pawl 67 and pivots it so that the plunger 70 engages the other side of the lug 68 and this will cause the other end of the pawl to engage the ratchet wheel and upon oscillating the handle 66, the ratchet wheel will turn in said opposite direction.

To load the trailer 14 on the car at a location where a lift truck is not available, such as a small railroad station, the operator turns the turntable 20 so that it is arranged diagonally of the car. The truck tractor then backs the rear end of the trailer 14 diagonally onto the car from the station platform so that the rear wheels at one side of the trailer are disposed in the turntable 20. The truck tractor then moves the front end of the trailer 14 onto the car with the rear wheels at the one side of the trailer pivoting with the turntable 20 while the rear wheels at the other side of the trailer roll on the floor 13 of the car. The dolly wheel structure 71 of the trailer is then swung from its position parallel to the bottom of the trailer 14 to a vertical position. The dolly wheel structure 71 is vertically adjustable, and by the turning of a crank, it can be extended to raise the front end of the trailer 14 off the truck tractor. The truck tractor then moves off the car. Upon the loading of the trailer 14 on the car, its rear end will be spaced a short distance from the projections 35 on the back support 17. The crank 43 is then turned so that the projections 35 move vertically until they are directly opposite the openings 46 in the bumper 16. At this time the pulling and pushing mechanism is not in the back support 17. The operator then positions the pulling and pushing mechanism behind the back support 17 so that the head 60 on the jackscrew 58 and the head 53 on the element 50 are disposed with their lengths vertical. The operator then moves the head 60 on the jackscrew 58 through the slot 48 in the back support 17 and movement is continued until the head on the jackscrew moves through the slot 62 in the bumper 16. In the meantime, the head 53 on element 50 will have moved through the slot 48 in the back support 17. The operator then turns the pushing and pulling mechanism ninety degrees so that the head 60 on the jackscrew 58 is arranged transversely of the slot 62 in the bumper 16 and the head 53 on the thrust element 50 is arranged transversely of the slot 48 in the back support 17. The operator then moves one end of the pawl 67 into engagement with the ratchet wheel 63 as shown in Fig. 9 and the handle 66 is oscillated to turn the ratchet wheel 63 in a counterclockwise direction as viewed in Fig. 9. This rotation of the ratchet wheel causes sliding movement of the jackscrew 58 through the element 50, the body 51 of which bears against the plate 27, and the head 60 on the jackscrew engages the bumper 16 and pulls the bumper toward the back support 17 so that the openings 46 in the bumper receive the projections 35 on the back support. The handles 41 are then pushed forwardly to cause the cams 36 to move forwardly off the pins 40. The handles 41 are then pushed downwardly, causing the cams 36 to be pivoted downwardly about the pins 38. The cams 36 upon being pivoted downwardly engage the lower roller 47 of the bumper so that the bumper 16 cannot move off the projections 35 on the back support 17. The pushing and pulling mechanism is then turned ninety degrees, and the head 60 on the jackscrew 58 moved through the slot 62 in the bumper 16 and the head 53 of the element 50 moved through the slot 48 in the back support 17, and then the head on the jackscrew is moved through the slot in the back support to completely remove the pushing and pulling mechanism from the back support. The fifth wheel stand 23 is then slid longitudinally of the car in the raised structure 22 until it is directly under the fifth wheel pin on the trailer 14. The fifth wheel stand 23 is vertically adjustable and it is raised until the stand receives the fifth wheel pin and bears against the bottom of the trailer 14.

To unload the trailer 14 from the car, the handles 41 are pulled upwardly and backwardly to move the cams 36 out of engagement with the lower rollers 47 and the notches 39 in the cams receive the pins 40 to hold the cams out of engagement with the rollers so that the bumper 16 may be moved off the projections 35. The fifth wheel stand 23 is then lowered so that the fifth wheel stand moves down to clear the fifth wheel pin on the trailer 14, and this lowering of the fifth wheel stand is continued until the front end of the trailer rests on the dolly wheel structure 71. The pushing and pulling mechanism is then inserted in the back support 17 as previously described, the head 60 on the jackscrew 58 being inserted through the slot 62 in the bumper 16. The other end of the pawl 67 is then engaged with the ratchet wheel 63 and oscillation of the handle 66 to turn the ratchet wheel clockwise as viewed in Fig. 9 will cause the jackscrew 58 to move forwardly through the element 50, the head 53 of which thrusts against the beams 49, and the collar 61 on the jackscrew will engage the bumper 16 and push the bumper off the projections 35 on the back support 17. The head 60 on the jackscrew 58 is then moved through the slot 62 in the bumper 16 and the pushing and pulling mechanism is then completely removed from the back support 17. The truck tractor then backs onto the car and under the trailer 14 and then the dolly wheel structure 71 is contracted vertically so that the front end of the trailer is lowered onto the truck tractor. The truck tractor then swings the front end of the trailer 14 off the car onto the station platform with the trailer rear wheels in the turntable 20 pivoting with the turntable and the other trailer rear wheels rolling on the floor 13 of the car. The truck tractor then pulls the rear end of the trailer 15 off the car to complete the unloading of the trailer from the car. The trailer 15 is loaded and unloaded from the car in a similar manner.

Railroad freight terminals in large municipalities all have lift trucks to load and unload truck trailers from railway flat cars, since it is practical and economically advantageous to use lift trucks due to the large volume of business. However, in small municipalities the railroad stations have a relatively small volume of freight business and therefore it would not be practical or economical for these railroad stations to have a lift truck, and most of them do not have one. Similarly, manufacturing, merchandising and warehousing organizations with freight docks at railroad sidings hadling a large volume of freight commonly use lift trucks, while others with a relatively small volume may not. The present invention makes feasible the loading and unloading of trailers onto or off railway cars by the tractor itself without need for a lift truck. Referring to Fig. 1, it will be seen that the trailer 14 must be loaded on the car in the space between the wall 19 and the back support 17. A lift truck could load the trailer 14 on the car and move the bumper 16 onto the projections 35 with ease. However at locations where a lift truck is not available, a truck tractor drawing the trailer must load the trailer 14 on the car. The truck tractor can move the trailer 14 onto the car but it cannot move the bumper 16 onto the projections 35 on the back support 17 because once the trailer is arranged longitudinally of the car the truck tractor cannot back up the trailer. In order to back up the trailer 14, the truck tractor would have to be positioned longitudinally of the car and this is impossible since there is not enough room for both the truck tractor and the trailer to be arranged longitudinally of the car in the space between the wall 19 and the back support 17. In unloading the trailer 14, when the truck tractor swings the front end of the trailer off the car, the projections 35 may not come out of the openings 46 in the bumper 16 but instead may engage the edges of the openings. Applicants' pushing and pulling mechanism will pull the bumper 16 onto the projections 35 on the back support 17 and it will push the bumper off the projections. This mechanism may be completely removed from the back support 17 when not in use and stored at the railroad station or other location. It is usually not left in the back support 17 during transportation of the trailer 14 on the car, although this may be done if desired.

From the foregoing, it will be seen that there has been provided a pushing and pulling mechanism for a holddown device which will pull a trailer bumper on the projections on the device or push the bumper off the projections in loading and unloading trailers on freight cars at locations where a lift truck is not available to perform the operation.

What is claimed is:

1. A support adapted to be disposed on the floor of a freight vehicle for securing thereto a truck trailer being transported thereon, said support comprising a structure, an element carried by the structure and provided with an opening therethrough and a hole in the element in communication with the opening, a jackscrew slidably and nonrotatably mounted in the opening in the element and adapted to be engaged with the trailer, a ratchet wheel positioned in the hole in the element and provided with a threaded opening in threaded engagement with the screw, a handle having one end disposed in the hole in the element and swingably mounted on the screw, and means carried by the handle and adapted to engage the ratchet wheel to turn the ratchet wheel, turning of the ratchet wheel in one direction causing the trailer to be moved toward the structure.

2. A support adapted to be disposed on the floor of a freight vehicle for securing thereto a truck trailer being transported thereon, said support comprising a structure, an element carried by the structure and provided with an opening therethrough and a groove in the wall of the opening and a hole in the element in communication with the opening, a jackscrew positioned in the opening in the element and provided with a groove therein and adapted to be engaged with the trailer, a key secured in the groove in the opening in the element and disposed in the groove in the screw to slidably and nonrotatably mount the screw in the element, a ratchet wheel positioned in the hole in the element and provided with a threaded opening in threaded engagement with the screw, a handle having one end disposed in the hole in the element and swingably mounted on the screw, and means carried by the handle and adapted to engage the ratchet wheel to turn the ratchet wheel in either direction, turning of the ratchet wheel in one direction causing the trailer to be moved away from the structure and turning of the ratchet wheel in the opposite direction causing the trailer to be moved toward the structure.

3. A support adapted to be disposed on the floor of a freight vehicle for securing thereto a truck trailer being transported thereon, said truck trailer having a horizontally disposed bumper, said support comprising a structure having a slot and an element including a body and a neck and a head having a transverse dimension greater than the width of the slot in the structure and the other transverse dimension being less than the width of the slot in the structure and the neck being positioned in the slot in the structure and the greater transverse dimension of the head being arranged transversely of the slot in the structure, a jackscrew movably mounted in the element, a head on one end of the screw having one transverse dimension less than the width of the slot in the structure, movement of the screw through the element in one direction causing the head on the screw to engage the bumper and pull the bumper toward the structure and turning of the element and the screw allowing the head on the element and the head on the screw to be passed through the slot in the structure whereby the mechanism may be completely removed from the structure.

4. A support adapted to be disposed on the floor of a freight vehicle for securing thereto a truck trailer being transported thereon, said truck trailer having a horizontally disposed bumper, said support comprising a structure having a slot and an element including a body and a neck and a head having a transverse dimension greater than the width of the slot in the structure and the other transverse dimension being less than the width of the slot in the structure and the neck being positioned in the slot in the structure and the greater transverse dimension of the head being arranged transversely of the slot in the structure, a jackscrew movably mounted in the element, a head on one end of the screw having one transverse dimension greater than the width of the slot in the bumper and its other transverse dimension being less than the width of the slot in the bumper and less than the width of the slot in the structure and the greater transverse dimension of the head of the screw being arranged transversely of the slot in the bumper, movement of the screw through the element in one direction causing the head on the screw to engage the bumper and pull the bumper toward the structure and turning of the element and the screw allowing the head on the element and the head on the screw to be passed through the slot in the structure whereby the mechanism may be completely removed from the structure.

5. A support adapted to be disposed on the floor of a freight vehicle for securing thereto a truck trailer having a bumper provided with a vertically extending slot, said support comprising a structure having a vertically extending slot, a mechanism comprising an element including a body having a transverse dimension greater than the width of the slot in the structure and a neck and a head having a transverse dimension greater than the width of the slot in the structure and the other transverse dimension being less than the width of the slot in the structure and the neck being positioned in the slot in the structure and the greater transverse dimension of the head being arranged transversely of the slot in the structure and the transverse dimension of the body being arranged transversely of the slot in the structure, a jack screw slidably and nonrotatably mounted in the element, a head on one end of the screw having one transverse dimension greater than the width of the slot in the bumper and its other transverse dimension being less than the width of the slot in the bumper and less than the width of the slot in the structure and the greater transverse dimension of the head being arranged transversely of the slot in the bumper, a stop spaced from the head on the screw and secured to the screw and having a transverse dimension greater than the width of the slot in the bumper and less than the width of the slot in the structure, movement of the screw through the element in one direction causing the stop to engage the bumper and push the bumper away from the structure and movement of the screw through the element in the opposite direction causing the head on the screw to engage the bumper and pull the bumper toward the structure and turning of the element and the screw ninety degrees with respect to the structure allowing the head on the element and the head on the screw to be passed through the slot in the structure whereby the mechanism may be completely removed from the structure.

6. A support adapted to be disposed on the floor of a freight vehicle for securing thereto a truck trailer being transported thereon, said support comprising a structure including an element provided with an opening therethrough and a hole extending transversely therethrough in communication with the opening, a jackscrew slidably and nonrotatably mounted in the opening in the element, a ratchet wheel positioned in the hole in the element and having a threaded opening in threaded engagement with the screw, a handle having a yoke on one end and the yoke being disposed on opposite sides of the ratchet wheel and swingably mounted on the screw, a double-acting pawl positioned in the yoke and pivotally mounted at its center in the yoke, a lug positioned at the center of the pawl and secured thereto, a plunger slidably mounted in the handle, a spring mounted in the handle and urging the plunger into engagement with the pawl on either side of the lug, one end of the pawl being adapted to engage the ratchet wheel to rotate the ratchet wheel in one direction and cause movement of the screw through the element in one direction and the other end of the pawl being adapted to engage the ratchet wheel to rotate the ratchet wheel in the opposite direction and cause movement of the screw through the element in the opposite direction.

7. A support adapted to be disposed on the floor of a freight vehicle for securing thereto a truck trailer being transported thereon, said support comprising a structure including an element provided with an opening therethrough and a groove in the wall of the opening and a hole extending transversely therethrough in communication with the opening, a jackscrew positioned in the opening in the element and provided with a groove, a key secured in the groove in the opening in the element and disposed in the groove in the screw slidably and nonrotatably mounting the screw in the element, a ratchet wheel positioned in the hole in the element and having a threaded opening in threaded engagement with the screw, a handle having a yoke on one end and the yoke being disposed on opposite sides of the ratchet wheel and swingably mounted on the screw, a pawl positioned in the yoke and pivotally mounted at its center in the yoke, a lug positioned at the center of the pawl and secured thereto, a plunger slidably mounted in the handle, a spring mounted in the handle and urging the plunger into engagement with the pawl on either side of the lug, one end of the pawl being adapted to engage the ratchet wheel to rotate the ratchet wheel in one direction and cause movement of the screw through the element in one direction and the other end of the pawl being adapted to engage the ratchet wheel to rotate the ratchet wheel in the opposite direction and cause movement of the screw through the element in the opposite direction.

8. A support adapted to be disposed on the floor of a freight vehicle for securing thereto a truck trailer being transported thereon, said truck trailer having a horizontally disposed bumper provided with a pair of spaced openings, said support comprising a structure having a pair of spaced horizontally disposed projections, a mechanism positioned between the projections and mounted in the structure and comprising an element provided with an opening therethrough and a hole in communication with the opening, a horizontally disposed screw slidably and nonrotatably mounted in the opening in the element and having a head on one end, a ratchet wheel positioned in the hole in the element and provided with a threaded opening therethrough in threaded engagement with the screw, a handle having one end disposed in the hole in the element and swingably mounted on the screw, and means carried by the handle and adapted to engage the ratchet wheel to turn the ratchet wheel, the projections being adapted to project through the openings in the bumper and the head on the screw being adapted to engage the bumper and rotation of the ratchet wheel in one direction causing the head on the screw to engage the bumper and pull the bumper on the projections.

9. A support adapted to be disposed on the floor of a freight vehicle for securing thereto a truck trailer being transported thereon, said truck trailer having a horizontally disposed bumper provided with a pair of spaced openings and a vertically extending slot between the openings, said support comprising a structure provided with a vertically extending slot, a pair of spaced horizontally disposed projections on opposite sides of the slot in the structure and carried by the structure, and a mechanism comprising an element having a body provided with a hole extending transversely therethrough and a neck and a substantially rectangular-shaped head having a length greater than the width of the slot in the structure and having a width less than the width of the slot in the structure and an opening extending through the body and neck and head and the neck being positioned in the slot in the structure and the head being arranged transversely of the slot in the structure, a horizontally disposed screw slidably and nonrotatably mounted in the opening in the element and the screw having a substantially rectangular-shaped head having a length greater than the width of the slot in the bumper and having a width less than the width of the slot in the bumper and less than the width of the slot in the strucure and a collar spaced from the head and having a diameter greater than the width of the slot in the bumper and less than the width of the slot in the structure, a ratchet wheel positioned in the hole in the element and provided with a threaded opening therethrough in threaded engagement with the screw, a handle having one end disposed in the hole in the element and swingably mounted on the screw, and means carried by the handle and adapted to engage the ratchet wheel to turn the ratchet wheel in either direction, the projections being adapted to project through the openings in the bumper and the head on the screw being adapted to project through the slot in the bumper and arranged transversely of the slot and rotation of the ratchet wheel in one direction causing the collar to engage the bumper and push the bumper off the projections and rotation of the ratchet wheel in the opposite direction causing the head on the screw to engage the bumper and pull the bumper on the projections and turning of the element and the screw ninety degrees with respect to the structure allowing the head on the element and the head on the screw to be passed through the slot in the structure whereby the mechanism may be completely removed from the structure.

10. A support adapted to be disposed on the floor of a freight vehicle for securing thereto a truck trailer being transported thereon, said truck trailer having a horizontally disposed bumper, said support comprising a structure, a thrust element carried by the structure and provided with an opening therethrough, a horizontally disposed elongated member slidably and nonrotatably mounted in the opening in the thrust element, a head on one end of the member, a stop on the member spaced from the head, and means in engagement with the thrust element and the member for moving the member through the opening, movement of the member through the thrust element in one direct causing the head on the member to engage the bumper and move the trailer toward the structure and movement of the member through the element in the opposite direction causing the stop on the member to engage the bumper and move the trailer away from the structure.

References Cited in the file of this patent

UNITED STATES PATENTS

| | | |
|---|---|---|
| 1,611,410 | Bryant | Dec. 21, 1926 |
| 1,785,923 | Wade | Dec. 23, 1930 |
| 2,204,667 | Dooley et al. | June 18, 1940 |
| 2,503,368 | Willets | Apr. 11, 1950 |
| 2,519,721 | Taylor | Aug. 22, 1950 |